June 29, 1948.   C. W. CARNAHAN   2,444,218
FREQUENCY-MODULATED RADIO-PHONOGRAPH COMBINATION
Filed Aug. 11, 1941   3 Sheets-Sheet 1
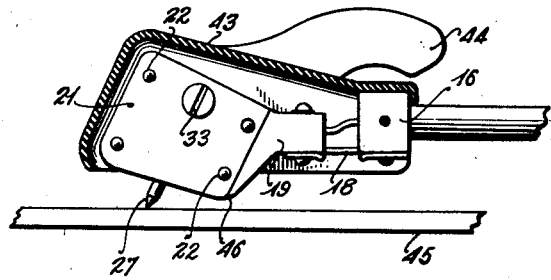
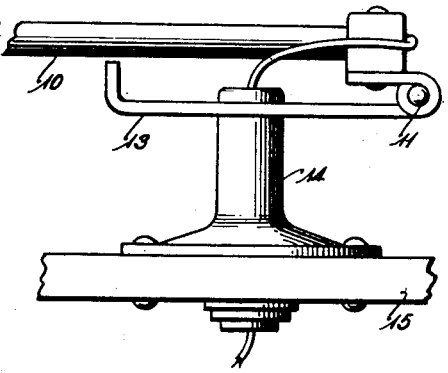
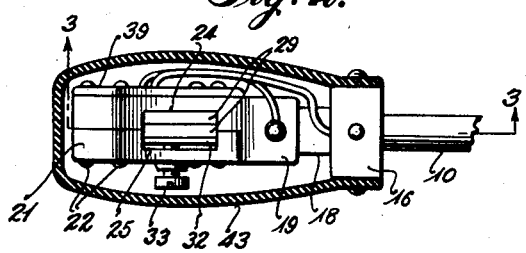
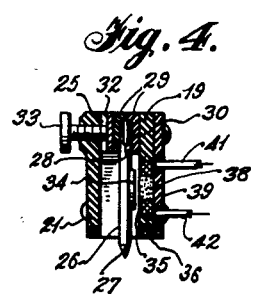
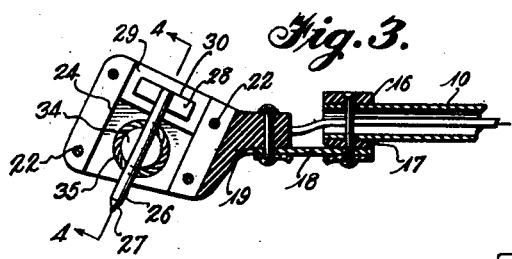
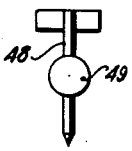
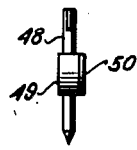
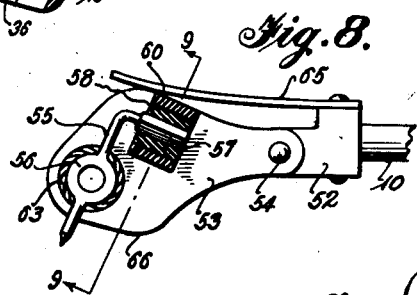
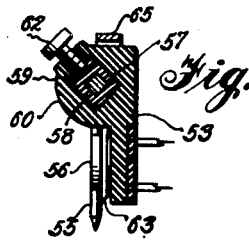
Inventor
Chalon W. Carnahan
By Bacon & Thomas
Attorneys June 29, 1948. C. W. CARNAHAN 2,444,218
FREQUENCY-MODULATED RADIO-PHONOGRAPH COMBINATION
Filed Aug. 11, 1941 3 Sheets-Sheet 2
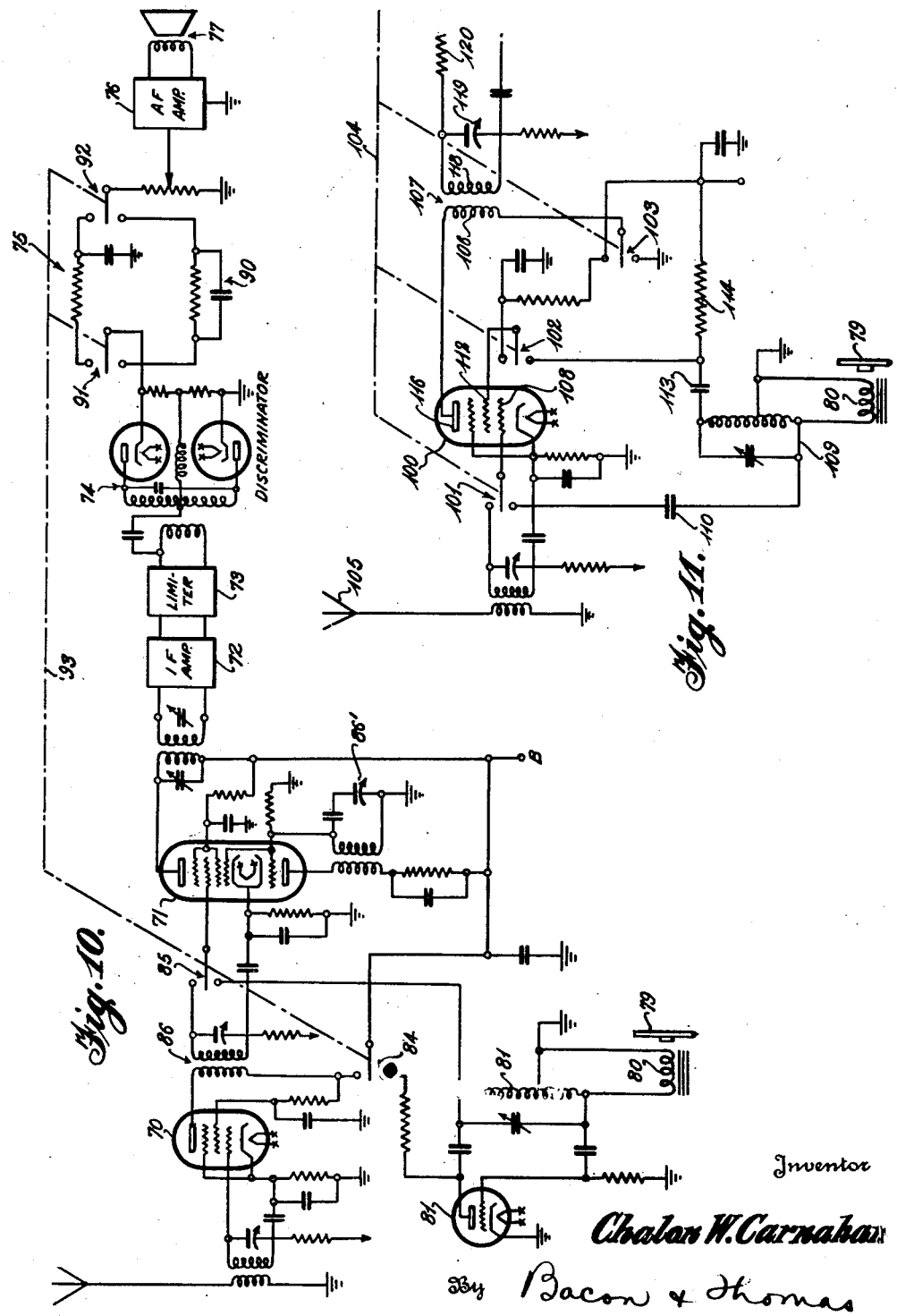
Inventor
Chalon W. Carnahan
By Bacon & Thomas
Attorneys

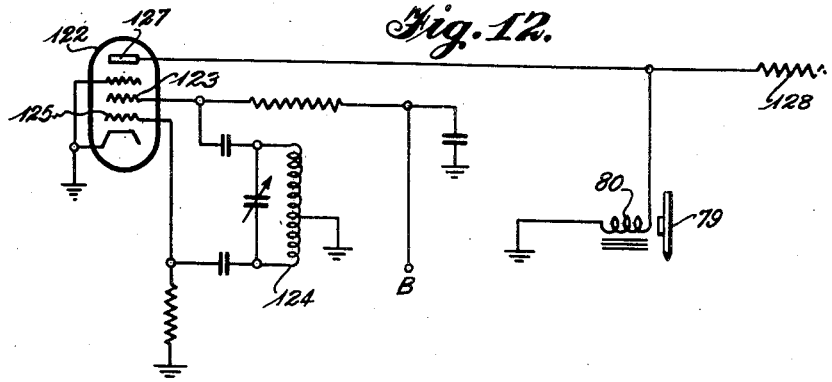
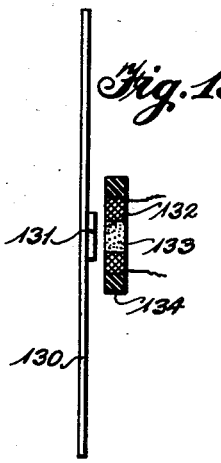
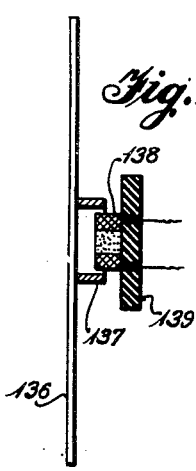
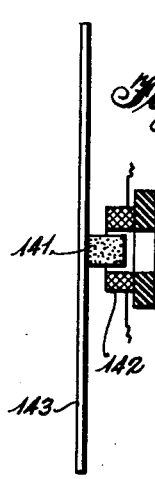
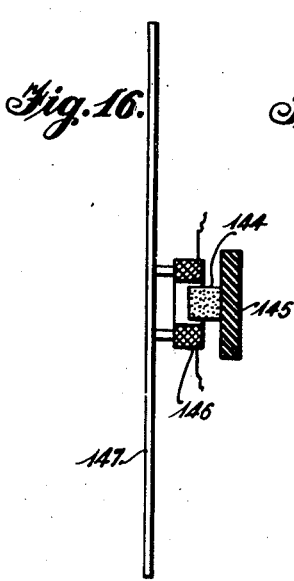
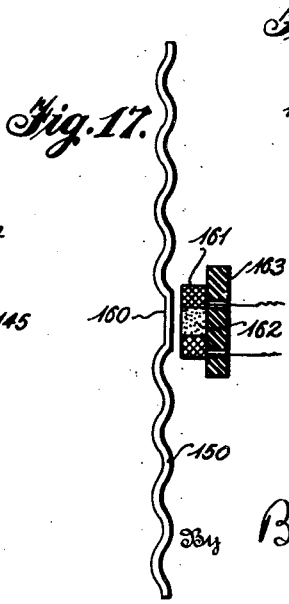
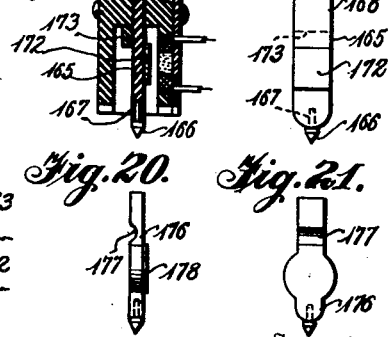
Inventor
Chalon W. Carnahan
By Bacon & Thomas
Attorneys Patented June 29, 1948

2,444,218

UNITED STATES PATENT OFFICE 2,444,218

FREQUENCY-MODULATED RADIO-PHONOGRAPH COMBINATION

Chalon W. Carnahan, Oak Park, Ill., assignor to Zenith Radio Corporation, Chicago, Ill., a corporation of Illinois Application August 11, 1941, Serial No. 406,431

5 Claims. (Cl. 179—100.11)

1

This invention relates to a sound reproduction system and more particularly to a system employing a novel type of mechanism for converting sound waves, either the original air-pressure waves or those derived from recordings such as phonograph records, into electrical waves and reproducing the same as sound waves.

The system of the present invention is particularly adapted to reproduction of sound waves from phonograph records in connection with radio receiving sets for receiving frequency modulated signals, but certain elements of the invention have utility in other environments. Thus, the present invention involves a novel pick-up or microphone which cooperates with a source of radio frequency power for producing frequency modulated signals which can be impressed upon the circuit of a radio receiver for receiving frequency modulation signals in order to reproduce the sound vibration originally impressed upon a phonograph stylus or upon the microphone. The pick-up or microphone of the present invention can, however, be employed to amplitude modulate a radio frequency voltage so that the resulting signal can be delivered to the radio frequency or intermediate frequency circuit of a radio receiver for receiving amplitude modulation signals.

The pick-up or microphone of the present invention may be constructed with extremely small moving parts and in a preferred embodiment of the present invention sound vibration impressed upon the pick-up or microphone are employed to vary, in accordance with the sound vibrations, the inductance of a circuit including a coil carried by the pick-up or microphone. A radio frequency alternating voltage is also impressed upon the pick-up or microphone and the change in inductance is employed to vary either the frequency of the voltage or its amplitude.

A more specific aspect of the invention includes a means for altering the circuits of a frequency modulation radio receiver in order to adapt the same for employment with the microphone or pick-up of the present invention.

It is, therefore, an object of the invention to provide a novel pick-up or microphone having extremely light moving parts which is employed in conjunction with a radio frequency voltage to change a characteristic of such voltage.

Another object of the invention is to provide an improved pick-up, all elements of which may be light in weight so as to enable the stiffness of the stylus and the needle pressure to be reduced to as small a value as is consistent with tracking.

2

Another object of the invention is to provide an improved pick-up or microphone particularly suitable for employment with radio receivers for frequency modulated signals in order to convert the same into a system for reproducing sound vibrations obtained from a local source.

Other objects and advantages of the invention will appear in the following description and drawings of the preferred embodiments of the invention in which:

Fig. 1 is a side elevation of a pick-up of the present invention with part of the protecting casing broken away;

Fig. 2 is a fragmentary plan view of the device of Fig. 1 with part of the protecting casing broken away;

Fig. 3 is a fragmentary vertical section taken on the line 3—3 of Fig. 2;

Fig. 4 is a fragmentary vertical section taken on the line 4—4 of Fig. 3;

Fig. 5 is a view similar to Fig. 3 with certain parts removed;

Fig. 6 is a side elevation of a modified form of stylus;

Fig. 7 is a front elevation of the stylus of Fig. 6;

Fig. 8 is a fragmentary elevation, partly in section, of the modified form of the pick-up;

Fig. 9 is a section taken on the line 9—9 of Fig. 8;

Fig. 10 is a schematic diagram of a circuit in accordance with the present invention;

Fig. 11 is a fragmentary view similar to Fig. 10 showing a modified circuit;

Fig. 12 is a view similar to Fig. 11 showing a still further modified circuit;

Fig. 13 is a diagrammatic view of a microphone in accordance with the present invention;

Fig. 14 is a view similar to Fig. 13 showing a modified type of microphone;

Figs. 15, 16 and 17 are views similar to Fig. 13 showing still further modified types of microphones;

Fig. 18 is a view similar to Fig. 4 showing a further modification;

Fig. 19 is a front elevation of the stylus of Fig. 18;

Fig. 20 is a side elevation of a still further modified type of stylus; and

Fig. 21 is a front elevation of the stylus of Fig. 20.

Referring to Figs. 1 to 5 inclusive, the pick-up shown therein includes a supporting arm 10 preferably in the form of a light metal tube. The tube 10 is hinged at 11 for pivotal movement about a horizontal axis to a member 13 in turn supported for rotation about a vertical axis by a member 14 secured to a stationary support 15. The other end of the arm 10 may receive a pick-up supporting member 16 which is preferably a member of light molded material such as thermoplastic or thermosetting material having a bore 17 therein for receiving the tube 10. The member 16 may have secured to the lower surface thereof a leaf spring 18 to which is secured a pick-up frame member 19 to provide vertical compliance between the arm 10 and the pick-up frame member 19. As shown more clearly in Figs. 4 and 5, the pick-up frame member 19 may have a cutout portion for receiving a stylus clamping member 21 secured thereto by suitable fastening means 22. As shown more clearly in Fig. 2, both the pick-up frame member 19 and the stylus clamping member 21 may be provided with slots 23 and 24 extending downwardly at an angle and cooperating to form an opening between the pick-up frame member 19 and clamping member 21 to receive a stylus 26.

The stylus 26 may include the conventional record engaging point 27 at its lower end and be provided at its upper end with a cross member 28 adapted to be clamped between small blocks 29 of rubber or other suitable resilient material. As shown in Fig. 5, the blocks 29 may, if desired, be chambered at 30 to receive the stylus 26 and cross member 28 or the resiliency of the blocks themselves may be depended upon to hold the stylus in desired position. The rubber blocks 29 may be merely clamped between the frame member 19 and clamping member 21 but it is preferred to provide means for adjusting the clamping force in order to adjust the stiffness of the stylus. This may be accomplished by providing a small plate 32 bearing against one of the blocks 29 and compressed against blocks 29 by means of an adjusting screw 33 extending through a screw threaded aperture in the clamping member 21.

The stylus 26 may carry a small conducting plate 34 intermediate its ends and adjacent a coil 35 carried in an aperture 36 in the wall of the frame member 19. The coil 35 is preferably wound of relatively small wire and also preferably contains a small core 38 of magnetic material having low eddy current losses such as a core of compressed powdered magnetic iron or alloy. The coil 35 may be cemented in the aperture 36 and is preferably retained therein by a retaining plate 39 (Fig. 4) through which the leads 41 and 42 from the coil 35 extend. The plate 34 of conducting material acts as a short-circuited turn for the coil 35 and lateral movement of the stylus 26 varies the distance between the plate 34 and the coil 35 so as to vary the inductance of the coil.

The pick-up unit including the frame member 19 and clamping member 21 is preferably housed within a protecting casing 43 secured to and supported by the member 16 carried by the tube 10. The casing 43 may be provided with a handle 44 for manual placing of the pick-up assembly. It will be noted that the pick-up frame member 19 has a portion 46 intermediate the stylus 26 and the supporting member 16 which is closely adjacent the surface of the record 45 so that undue downward pressure on the pick-up assembly causes the portion 46 to engage the record to flex the spring 18 and lift the stylus from the record by moving the pick-up frame member upwardly onto the casing 43. The spring 18 is just of sufficient strength to enable the needle 26 to support the pick-up assembly so that pressure or shock on the needle due to dropping the pick-up assembly upon the record or inadvertently forcing the same against the record is largely absorbed by the portion 46 of the frame member 19 to prevent damage to the point 27 of the stylus 26.

As far as possible the record end of the pick-up assembly, including the casing 43, supporting member 16, pick-up frame member 19 and clamping member 21, is preferably made of light insulating material so as to limit the needle pressure. At least the frame member 19 and the clamping member 21 are preferably made of low loss insulating material, for example, polystyrene, since in accordance with the present invention radio frequency electric currents flow in the coil 35.

The stylus 26 is preferably made of a single piece of metal. In such case the plate 34 and cross member 28 are integral with the stylus. The preferred metal for the stylus and plate 34 is that having the highest ratio of electrical conductivity to weight and the metal which has been found most satisfactory is an aluminum alloy with approximately 4% copper, fractional percentages of magnesium and manganese, and small amounts of iron and silicon. Other good conducting metals such as copper, nickel, silver, etc. may be employed and the plate 34 is preferably non-magnetic to avoid any magnetic attraction between the plate 34 and the core 38 of the coil 35, although a magnetic material can be employed for the plate. It is apparent that the plate 34 and stylus 26 may be of different metals suitably secured together. The cross member 28 may take various forms but preferably comprises flat members extending at right angles to the body of the stylus 26 to hold the stylus properly positioned relative to the coil 35 and impart the necessary stiffness of stylus operation.

In Figs. 6 and 7 is shown a modified stylus 48. Instead of having a metal plate secured to the stylus, the stylus may extend through an aperture in a member 49 of light weight insulating material having a conducting surface 50 which may be a thin sheet of conducting material, for example silver or copper, secured thereto by an adhesive or by plating the metal upon the surface of the insulating material.

A modified type of pick-up unit is shown in Figs. 8 and 9 which may include a supporting member 52 carried by the tube 10 having a pick-up frame member 53 pivotally connected thereto at 54. A stylus 55 may have an intermediate portion 56 in the form of a ring instead of a metal plate and may have a right angle portion at its upper end terminating in a square or polygonal shank 57 received within a bushing 58 of rubber or other suitable resilient material in turn received within an aperture 59 in a boss 60 carried by the frame member 53. An adjusting screw 62 extending through a wall of the boss 60 may be employed to vary the compression upon the shank 57 of the stylus 55. A coil 63 similar to the coil 35 of Figs. 1 to 5, inclusive, may be carried by the frame member 53 adjacent the ring portion 56 of the stylus 55 so that movement of the stylus 55 causes the distance between the ring portion 56 and the coil to be varied and thus varies the inductance of the coil 63. A leaf spring 65 carried by the supporting member 52 and bearing against the frame member 53 may provide vertical compliance between the frame member 53 and the arm 10 and the frame member 53 may be provided with a depending portion 66 for engagement with the record to prevent undue force from being applied at the point of the stylus 55. As in the case of the pick-up of Figs. 1 to 5, member 53 is preferably made of light weight insulating material having low loss electrical characteristics.

One of the primary uses of the pick-ups of Figs. 1 to 9 is in connection with a radio receiver for receiving frequency modulated signals. Such a set usually includes a radio frequency amplifier stage represented by the tube 70 (Fig. 10), an oscillator and mixer stage represented by the tube 71, an intermediate frequency amplifier section 72, an amplitude limiter 73, a frequency discriminator indicated generally by 74, a high frequency de-emphasis circuit indicated generally by 75, an audio-frequency amplifier section 76 and a loud speaker 77. In the circuit of Fig. 10 the pick-up of Figs. 1 to 9 is represented by the stylus 79 and inductance coil 80 and is employed to frequency modulate the output of an oscillator shown as a triode 81. The triode 81 is shown connected as a typical shunt fed Hartley oscillator with the inductance coil of the pick-up connected across a portion of the tank inductance 81. In the circuits shown, one side of the inductance coil 80 can be connected to the ground connection 82 of the tank circuit so that one lead to the inductance coil 80 can be maintained at ground potential. Thus the supporting structure of the pick-up such as the arm 10 of Fig. 1 may form one lead and also form a shield for the other lead. In this circuit the oscillator 81 is substituted for the radio frequency amplifier tube 70 when the pick-up is employed and this is accomplished by switches 84 and 85, the switch 84 in its lower position breaking the plate circuit of the radio frequency amplifier tube 70 and completing the plate circuit of the oscillator 81 and the switch 85 in its lower position disconnecting the control grid of the mixer section of the tube 71 from the radio frequency transformer 86 and connecting this grid to the tank circuit of the oscillator 81.

The frequency band at present assigned for transmission of frequency modulation signals ranges from 40 to 50 megacycles and the oscillator 81 could be tuned to oscillate at a frequency in this range and the output thereof delivered directly to the mixer 71, or, alternatively to the input of the radio frequency amplifier tube 70. On the other hand, the oscillator 81 can be tuned to the intermediate frequency of the set which in some commercial sets is 8.3 megacycles or a close subharmonic of the intermediate frequency and this frequency delivered directly to the input of the intermediate frequency amplifier section. It is preferred however, to operate the oscillator 81 at a lower frequency such as, for example, 3.3 megacycles and impress this signal upon the control grid of the mixer. By this one or more harmonics of the pick-up oscillator frequency will heterodyne with the frequency of the usual oscillator of the set to produce the intermediate frequency of the set. For example, the 13th, 14th and 15th harmonics of the 3.3 megacycle signal are 42.9, 46.2 and 49.9 megacycles, which fall within the frequency modulation band. Varying the frequency produced by the usual oscillator of the set, for example by means of the tuning condenser 86, will heterodyne this frequency with one of the harmonics referred to to produce the intermediate frequency of the set. The precise figures given are by way of example as the precise frequency selected for the oscillator 81 may be any one of a large number of frequencies. In general it is preferred to select this frequency so that it is relatively low with respect to the range of frequencies normally received by the set and so that neither it nor any of its harmonics are close to the intermediate frequency of the set.

Variations of inductance of the pick-up coil 80 at the audio frequency varies the frequency of the oscillator 81 at the audio frequency, since the coil 80 is connected across a portion of the tank inductance and forms a part thereof. The variation of frequency of the oscillator 81 is relatively small unless the coil 80 is connected across the entire tank circuit. In such case capacity changes due to the swinging of the lead to the coil 80 or to body capacity of the user have an effect upon the frequency of the oscillator 81 which is relatively large. This effect can be made negligible by connecting the coil 80 across only a portion of the tank circuit but this also reduces the frequency deviation of the oscillator 81 due to variation in inductance of the coil 80. By operating the oscillator 80 at a relatively low frequency and selecting a relatively high harmonic of this frequency, the frequency deviation is multiplied by the order of the harmonic so that a relatively large frequency deviation is produced in the harmonic and in the intermediate frequency. As a specific example, when the set is tuned to the 14th harmonic of the oscillator operating at 3.3 megacycles, that is, to 46.2 megacycles, the sensitivity can be made approximately 36 kilocycles for a displacement of the stylus 79 .001 in. from center or 72 kilocycles peak to peak. This provides ample frequency deviation as the average peak displacement of the needle is in the neighborhood of .001 in. with a maximum possible of about .004 in. With the small moving parts which can be employed in the present pick-up, for example, the total effective mass of the stylus and disc at the needle point can be made as low as 25 m. g. or lower, the stiffness of the stylus can be reduced to as low as approximately $0.7 \times 10^6$ dynes per centimeter and the needle pressure can be reduced to approximately ½ ounce which is about as low as can be employed and still obtain reliable tracking of the stylus.

In the present system of frequency modulation transmission, the high audio frequencies are emphasized at the transmitting station so that frequency modulation receivers conventionally include a high frequency de-emphasis circuit in the audio frequency amplifying section which may take the form of the circuit 75. On the other hand, conventional records as now produced are velocity cut at the higher frequencies whereas the present pick-up is of the displacement type, thus requiring pick-up compensation for emphasizing high frequencies. It is therefore preferred to include such a pick-up compensation circuit, a simple type of which is shown at 90 in Fig. 10, in the circuit when using the circuits for reproduction of records. This may be accomplished by switches 91 and 92 which disconnect the high audio frequency de-emphasis circuit 75 and connect the pick-up compensation circuit 90 when the central contacts of the switches 91 and 92 are in their lower position. As indicated by the dotted line 93, all of the switches 84, 85, 91 and 92 may be operated simultaneously and form a part of a 4 pole double throw switch. Instead of employing the switches 91 and 92 and the pick-up compensation circuit 91, it is possible to mechanically tune the stylus 79 so as to emphasize the higher audio frequencies and thus leave the high frequency de-emphasis circuit 75 in circuit. It is difficult to secure such high frequency emphasis by tuning of the stylus 79 to accomplish this result but sufficient high frequency emphasis to eliminate the necessity of the circuit 90 can be more readily obtained in which case circuit 90 can be omitted and the circuit 75 merely removed from the circuit for phonograph reproduction.

A fragment of a modified circuit performing substantially the same operation as the circuit of Fig. 10 is shown in Fig. 11. In the circuit of Fig. 11 instead of employing a separate oscillator for the pick-up, the usual radio frequency amplifier tube 100 is converted into an oscillator tube. A plurality of switches 101, 102 and 103, which may all be a part of the same switch having a common operator, as indicated by the dotted line 104, may be employed to convert the tube 100 from a radio frequency amplifier to an oscillator. When the central contacts of the switches 101 to 103 inclusive are in their upper position, the tube 100 is connected as a radio frequency amplifier, amplifying the signal received by the antenna 105 and impressing the amplified signal upon the primary 106 of a radio frequency transformer 107. When the central contacts of switches 100 to 103 inclusive are in their lower position the central grid 108 of the tube 100 is connected to one terminal of a tank circuit 109 through a condenser 110. The screen grid 112 of the tube 100 is employed as the oscillator anode and is connected to the other terminal of the tank circuit 109 through a condenser 113 and to a source of positive voltage through a resistor 114, thus converting the tube 100 and its associated circuit into a shunt fed oscillator circuit. The plate 116 of the tube 100 is employed for electronically coupling the radio frequency transformer 107 to the oscillator portion of the tube 100. Sufficient signal is produced if the B supply for the plate 116 is disconnected from the plate by the switch 103 and the plate is connected to ground through the primary 106 of the transformer 107, although the switch 103 may be omitted and the B supply left on the plate, if desired.

The pick-up represented by the stylus 79 and coil 80 is connected across a portion of the tank circuit 109 so that one lead thereto is at ground potential. As in the case of the circuit of Fig. 10, the tank circuit 109 may be designed to operate at a relatively low frequency with respect to the frequency band which the set is adapted to receive and the tuning circuit, including the secondary 118 of the transformer 107 and the tuning condenser 119 may be employed to pick off a desired harmonic and impress the same upon the grid 120 of the following tube.

In Fig. 12 is shown a fragmentary diagram of the circuit illustrating how the pick-up of the present invention may also be employed for amplitude modulation. In this circuit the tube 122 has its grid 123 connected as the anode in an oscillator circuit including a tank circuit 124, the central grid 125 of the tube 122 being connected to the other terminal of the tank circuit 124. The plate 127 of the tube 122 is employed to electronically couple the grid 128 of the second tube which may be a radio frequency amplifier or mixer tube (not shown). The coil 80 of the pick-up including stylus 79 may comprise a shunt circuit to ground from the grid 128. As long as the inductance of the coil 80 remains constant a radio frequency of constant amplitude is impressed upon the grid 128 but variation in inductance of the coil 88 due to movement of the stylus 79 varies the amplitude of the radio frequency signal impressed on the grid 128. Since the circuit including the coil 80 is electronically coupled to the oscillator circuit, variation in the inductance of the coil 80 has no appreciable effect upon the frequency of the oscillator circuit including the tube 122. It will be apparent that other types of oscillator circuits or other types of oscillator tubes than those shown can be employed for receiving a radio frequency voltage either frequency or amplitude modulated.

The principle of the pick-up described may also be employed in a microphone, for example, as shown in Fig. 13 the microphone diaphragm 130 may carry a small conducting plate 131 positioned adjacent the coil 132 having a core 133 and supported by a member 134 which is preferably of low loss insulating material. The coil 132 may be connected to any of the circuits of Figs. 10 to 12 inclusive in the same manner as the coil 80 of these figures. A modified form of microphone structure is shown diagrammatically in Fig. 13 in which the diaphragm 136 carries a centrally disposed tubular member 137 surrounding the coil 138 supported on the member 139. This construction provides greater range of movement of the diaphragm 136 than is the case with the diaphragm 130 of Fig. 13.

Other possible constructions of microphones are shown in Figs. 15 and 16. In Figure 15 the magnetic core 141 is separate from the coil 142 and is carried by the diaphragm 143. It will be apparent that movement of the core 141 by the diaphragm 143 will vary the inductance of the coil 142. Figure 16 involves a reversal of the parts of Figure 15 in that the core 144 is carried by the stationary member 145 and the coil 146 is carried by the diaphragm 147. It will be further apparent that the construction of Figures 14 to 16 could be employed in a pick-up but that the moving parts of the pick-up would have considerably greater mass so that the construction of Figure 13 or Figures 1-9 inclusive is preferred for either pick-up or microphone construction.

Figure 17 illustrates the application of the principles of the present invention to a velocity or ribbon type of microphone in which the ribbon 150 has a flat central portion 160 adjacent a coil 161 having a core 162 both supported by a stationary member 163.

A further modification of a pick-up assembly is shown in Figs. 18 and 19 in which a stylus 165 fabricated largely of thermoplastic or thermosetting plastic material is employed. This stylus may include a body portion of said plastic having a tip member 166 preferably comprising a record engaging point such as a sapphire or other conventionally employed point carried in a metallic member having a reduced shank 167 received in a socket in the plastic body of the stylus and secured therein, for example, by a suitable adhesive. The necessary flexibility and stiffness of the stylus may be supplied by the material of the stylus body so that the upper end 168 of the stylus may be rigidly clamped between the pick-up frame member 169 and the clamping member 171. Thus the rubber cushioning members 29 of Fig. 4 may be omitted if the body of the stylus is sufficiently flexible but may be employed where a relatively stiff material forms the body of the stylus. Elimination of the rubber cushioning material tends to more positively retain the stylus in its proper position and makes possible the easy renewal of the stylus without disturbing the adjustment of the pick-up. The stylus is also provided with a conducting member 172 which may be a section of foil such as aluminum, silver or other relatively good conducting metal adhesively secured to the body of the stylus or a layer of such metal plated directly upon the body of the stylus. Cementing a piece 173 of viscous plastic material such as viscous cellulose or acrylate plastic, for example, viscous cellulose nitrate to the body of the stylus near the portion 168 clamped in the pick-up frame as shown in Fig. 18 so as to bear against the clamping member 171 provides a more uniform frequency response apparently by damping resonant peaks.

Flexibility of the body of a stylus made of metal is usually avoided as far as possible because of uncontrollable resonant peaks in the response. The high degree of self-damping in the plastic stylus reduces these peaks so that it is possible to use a resonant peak to boost the high frequency response. It has thus far been possible to produce a boost of from three to four times at 3500 cycles which is enough to compensate for the high frequency de-emphasis in a frequency modulation receiver.

As a specific example of a stylus in accordance with Figs. 18 and 19, the body of the stylus may comprise a piece of .020 inch thick sheet of cellulose nitrate plastic, the unclamped portion being ⅜" long by ¼" wide with a section of aluminum foil ¼" square cemented to the body opposite the coil and with a small piece of viscous cellulose nitrate approximately 1/16" by ⅛" x ¼" cemented to the body of the stylus adjacent the clamped portion and on the opposite face of the stylus from the aluminum foil.

A further modification of a stylus 176 having a plastic body is shown in Figs. 20 and 21. In this modification the body of the stylus is made somewhat thicker so as to keep the moving portion thereof relatively rigid. The required stiffness may then be obtained by notching the shank of the stylus near the clamped portion as shown at 177. In this manner, the high frequency peak due to the flexibility of the moving portion may be made to occur at a higher frequency without increasing the stiffness which is controlled by the thickness of the notched portion. While any suitable plastic material may be employed for the body of the stylus shown in Figs. 20 and 21, polystyrene has thus far given best results as it has a high ratio of stiffness to mass and is extremely stable against aging moisture, etc. As in the case of the stylus of Figs. 18 and 19, metallic foil or plating may be employed as shown at 178 to provide for varying the inductance of a coil adjacent the stylus.

In general pick-ups employing plastic materials for the body of the stylus are exceptionally free from needle chatter. This is probably due to a rapid attenuation of the high frequencies originating at the stylus, so that the reaction of the stylus on the supporting structure is greatly reduced at high frequencies. Also the plastic stylus appears to have a fairly rapid cut-off above 5000 cycles per second so that so called "needle noise" is greatly reduced without further precautions. The plastic stylus provides much easier fabrication and assembly and greater permanence of characteristics than a metallic stylus mounted in rubber and also is easier to replace.

All of the pick-ups and microphones of the present invention depend for their operation upon the energization of a small coil with radio frequency currents and variation of the inductance of the coil. In the preferred construction a light conducting member, preferably of non-magnetic material is vibrated at sound frequency adjacent the coil. In the preferred circuit employing the present pick-up or microphone, the varying inductance of the coil is employed to vary the characteristics of an oscillator tank circuit so as to frequency modulate the output of the oscillator and a relatively high harmonic of the oscillator is preferably amplified and demodulated to produce an audio frequency voltage applied to a loud speaker or other sound reproducing means such as a recording cutter. The microphone or pick-up of the present invention has practically unlimited low audio frequency response and excellent high frequency response. While all of the coils illustrated include a core of magnetic material, it is apparent that such core can be omitted where a movable conducting member constituting a short-circuited turn is employed, in which case the microphone or pick-up is still operative but with lessened efficiency. When the circuit for amplifying and demodulating the frequency modulated voltage produced by the microphone or pick-up of the present invention is not also employed to receive frequency modulated signals from a transmitter, either the high audio frequency de-emphasis circuit or limiter or both may be omitted although the limiter is advantageously employed in the present invention to eliminate any possible variations in amplitude of the oscillator voltage.

While I have disclosed the preferred embodiments of my invention, it is understood that the details thereof may be varied within the scope of the following claims:

What I claim is:

1. In a sound reproducing system a source of radio frequency voltage including an electronic tube and an oscillator circuit connected thereto including an inductance coil and a condenser, a second inductance coil connected across a portion only of said circuit and having one terminal at ground potential, a conducting member constituting a short circuited turn for said inductance coil positioned adjacent said inductance coil and movable relative thereto at audio frequency for varying the electrical characteristics of said circuit to produce a radio frequency voltage frequency modulated by said audio frequency and means for demodulating said frequency modulated voltage for reproducing said audio frequency.

2. A phonograph pick-up comprising a supporting arm, a pick-up member resiliently supported by said arm to provide vertical clearance between said member and said arm, a stylus carried by said member for engaging a record, an inductance coil carried by said member, and a conducting member positioned adjacent said coil and moved by said stylus to vary the inductance of said coil, said member having a portion positioned between said stylus and said resilient supporting means extending downwardly to a position adjacent the surface of said record whereby said portion engages said record upon the application of excessive downward force on said pick-up to prevent said force from being applied to the point of said stylus.

3. In a radio set for receiving a frequency modulated radio signal, said set having a high audio frequency de-emphasis circuit, a source of radio frequency voltage forming a part of said set, means including a displacement type of phonograph pick-up for frequency modulating said radio frequency voltage, a pick-up compensation circuit for emphasizing high audio frequencies and means for simultaneously supplying said voltage to said set and substituting said compensation circuit for said de-emphasis circuit.

4. A phonograph pickup comprising a pickup member, a stylus carried by said pickup member for engaging a record, an inductance coil carried by said pickup member, a conductive member forming a part of said stylus positioned adjacent said coil and moved with said stylus to vary the impedance of said coil, said pickup member having a portion spaced from said stylus and positioned to face the surface of a record, a supporting member, and a connection between said supporting member and said pickup member to provide for motion therebetween, said connection including a spring for holding said pickup member in a normal position with said needle in a position to touch a record before said spaced portion, said connection being positioned on the opposite side of said spaced portion from said stylus whereby said portion engages a record upon the application of excessive force on said pickup towards such record to prevent such force from being applied to the point of said stylus.

5. A phonograph pickup comprising a pickup member, a stylus carried by said pickup member for engaging a record, an inductance coil carried by said pickup member, a conducting member forming a part of said stylus positioned adjacent said coil and moved with said stylus to vary the impedance of said coil, said pickup member having a portion spaced from said stylus and positioned to face the surface of a record, a supporting member, and a connection between said supporting member and said pickup member to provide for motion therebetween, said connection including a pivot and a spring for holding said pickup member in a normal position with said stylus in a position to touch a record before said spaced portion, said pivot being positioned on the opposite side of said spaced portion from said stylus whereby said portion engages a record upon the application of excessive force on said pickup towards such record to prevent such force from being applied to the point of said stylus.

CHALON W. CARNAHAN.

REFERENCES CITED

The following references are of record in the file of this patent:

UNITED STATES PATENTS

| Number | Name | Date |
| --- | --- | --- |
| 1,409,630 | Widman | Mar. 14, 1932 |
| 1,744,922 | Robinson | Jan. 28, 1930 |
| 1,653,878 | Schelleng | Dec. 27, 1927 |
| 1,939,940 | Wright | Dec. 19, 1933 |
| 1,968,149 | Hutter | July 31, 1934 |
| 2,060,611 | Crosby | Nov. 10, 1936 |
| 2,112,010 | Brimberg | Mar. 22, 1938 |
| 2,115,917 | Shanck | May 3, 1938 |
| 2,229,640 | Crosby | Jan. 28, 1941 |
| 2,250,532 | Hansell | July 29, 1941 |
| 2,276,562 | Capps | Mar. 17, 1942 |

FOREIGN PATENTS

| Number | Country | Date |
| --- | --- | --- |
| 372,428 | Great Britain | May 12, 1932 |
| 373,973 | Great Britain (Void) | June 30, 1932 |